United States Patent
Ren et al.

(10) Patent No.: US 7,688,808 B2
(45) Date of Patent: Mar. 30, 2010

(54) MOBILE ACCESS NODE ROUTING SELECTIONS THROUGH A MESH NETWORK

(75) Inventors: Wenge Ren, Sunnyvale, CA (US); Amalavoyal Chari, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 462 days.

(21) Appl. No.: 11/385,947

(22) Filed: Mar. 21, 2006

(65) Prior Publication Data

US 2007/0223451 A1 Sep. 27, 2007

(51) Int. Cl.
*H04L 12/66* (2006.01)

(52) U.S. Cl. .................. 370/352; 370/338; 370/401; 370/329; 455/412.1

(58) Field of Classification Search .............. 370/352, 370/338, 401, 328, 329; 455/412.1
See application file for complete search history.

(56) References Cited

U.S. PATENT DOCUMENTS

| | | | |
|---|---|---|---|
| 5,471,469 A | 11/1995 | Flammer, III et al. | |
| 5,572,528 A | 11/1996 | Shuen | |
| 6,044,062 A | 3/2000 | Brownrigg et al. | |
| 6,097,703 A | 8/2000 | Larsen et al. | |
| 6,249,516 B1 | 6/2001 | Brownrigg et al. | |
| 6,493,377 B2 | 12/2002 | Schilling et al. | |
| 6,879,574 B2 | 4/2005 | Naghian et al. | |
| 2004/0171347 A1 | 9/2004 | Burton et al. | |
| 2004/0203787 A1 | 10/2004 | Naghian | |
| 2004/0252643 A1 | 12/2004 | Joshi | |
| 2006/0198349 A1* | 9/2006 | Ng et al. | 370/338 |
| 2007/0021106 A1* | 1/2007 | Kawasaki et al. | 455/412.1 |

* cited by examiner

*Primary Examiner*—Charles N Appiah
*Assistant Examiner*—Michael T Vu
(74) *Attorney, Agent, or Firm*—Brian R. Short

(57) ABSTRACT

An apparatus and method of a mobile access node selecting a routing path through a mesh network is disclosed. The method includes receiving routing packets from at least one upstream access node, the routing packets including information of at least one upstream access node along a path to a gateway access node. A weight is assigned to each received routing packet, wherein the weight is dependent on how recently the routing packet is received. A packet success rate is calculated for each upstream access node by summing routing packets weights over a period of time for each upstream access node. The mobile node selecting the routing path through one of the at least one upstream access node based upon the packet success rate of routing packets received from each upstream access node.

22 Claims, 5 Drawing Sheets

MOBILE ACCESS NODE ROUTING SELECTIONS THROUGH A MESH NETWORK

FIELD OF THE INVENTION

The invention relates generally to wireless communications. More particularly, the invention relates to a method and apparatus of mobile access node routing selections through a mesh network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

FIG. 1 shows a prior art mesh network that includes a gateway 110 connecting a client device 140 to a network (internet) 100 through fixed access nodes 120, 130. The connections between the gateway 110 and the access nodes 120, 130 can be wireless. Additionally, the connection between the access nodes 120, 130 and the client 140 can be wireless. Wireless connections typically are subject to conditions that can make the connections unreliable. Such conditions include fading, multi-path and signal interference.

Each of the access nodes of the mesh network can have several possible paths to a gateway. Each access node must select a route which desirably is the best possible route to a gateway.

Some mesh networks can additionally include mobile access nodes. Mobile access nodes add another layer of complexity because typically optimal routes continually change for mobile access nodes. Therefore, the routing selection for a mobile access node is more complex than the routing selection for a fixed access node.

Mobile access nodes are generally engineered to be mounted inside automotive vehicles and draw power from the battery of the vehicle. They are also engineered to meet environmental and thermal specifications relevant to the automotive environments. By contrast, fixed access nodes are typically engineered to be mounted on streetlights, utility poles, cable strands and the like and to accept a wide variety of AC and DC voltages. They are typically engineered to meet a different set of environmental specifications including different thermal requirements, wind-loading, lightning- and surge-protection, etc.

It is desirable to have a wireless mesh network that includes fixed and mobile access nodes, that continually analyzes the quality of routing paths through the wireless mesh network, and selects an optimal path from among all available routing paths.

SUMMARY OF THE INVENTION

The invention includes systems and methods of mobile node routing through a mesh network.

An embodiment includes a method of a mobile access node selecting a routing path through a mesh network. The method includes receiving routing packets from at least one upstream access node, the routing packets including information of at least one upstream access node along a path to a gateway access node. A weight is assigned to each received routing packet, wherein the weight is dependent on how recently the routing packet is received. A packet success rate is calculated for each upstream access node by summing routing packets weights over a period of time for each upstream access node. The mobile node selecting the routing path through one of the at least one upstream access node based upon the packet success rate of routing packets received from each upstream access node.

Another embodiment includes a method of selecting routing paths through a wireless mesh network comprising fixed access nodes and mobile access nodes. The method includes at least one gateway access node originating routing packets at a predetermined rate. Each fixed access nodes selects an upstream route through an upstream fixed access node based upon a packet success rate of routing packets received from at least one upstream access node. Each mobile access nodes assigns a weight to each received routing packet, wherein the weight is dependent on how recently the routing packet is received. The mobile nodes calculate a packet success rate for each upstream access node by summing routing packets weights over a period of time for each upstream access node. The mobile nodes select the routing path through one of the at least one upstream access node based upon the packet success rate of routing packets received from each upstream access node.

Other aspects and advantages of the present invention will become apparent from the following detailed description, taken in conjunction with the accompanying drawings, illustrating by way of example the principles of the invention.

DETAILED DESCRIPTION

Figure 1:
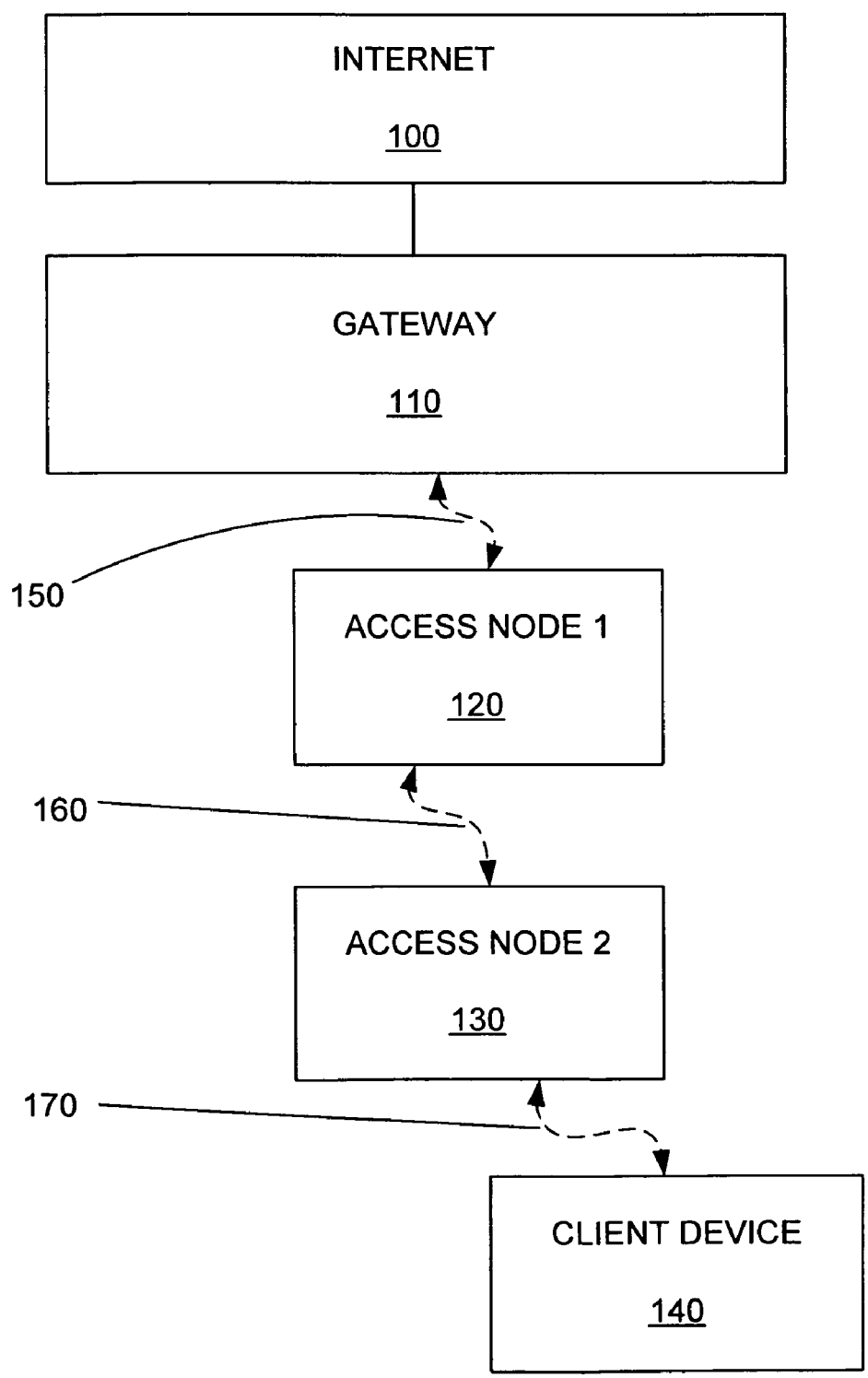
FIG. 1 shows a prior art mesh network.

As shown in the drawings for purposes of illustration, the invention is embodied in an apparatus and method for mobile access nodes analyzing a quality of routing paths of a wireless network that includes fixed access nodes and mobile access nodes, and selecting an optimal path from among all available routing paths.

Mobile access nodes can be used to extend the coverage area afforded by the fixed access nodes. In addition, mobile access nodes can also provide network connectivity to client devices which are either wireless-enabled or are directly plugged into an Ethernet port on the mobile access node. Mobile access nodes can connect wirelessly to the mesh network and join it through fixed or mobile access nodes.

Fixed access nodes are typically mounted on streetlights, utility poles, cable strands and the like. An embodiment of mobile access nodes are designed to be mounted inside an automobile, typically in the trunk, and drawing power from the battery of the automobile. Fixed access nodes can connect together wirelessly to form a mesh network that provides coverage to wireless client devices such as laptops or PDAs equipped with wireless radios. A fraction of the fixed access nodes can have provisioned backhaul over fiber or Ethernet or WiMax or other point-to-point or point-to-multipoint wireless backhaul.

Figure 2:
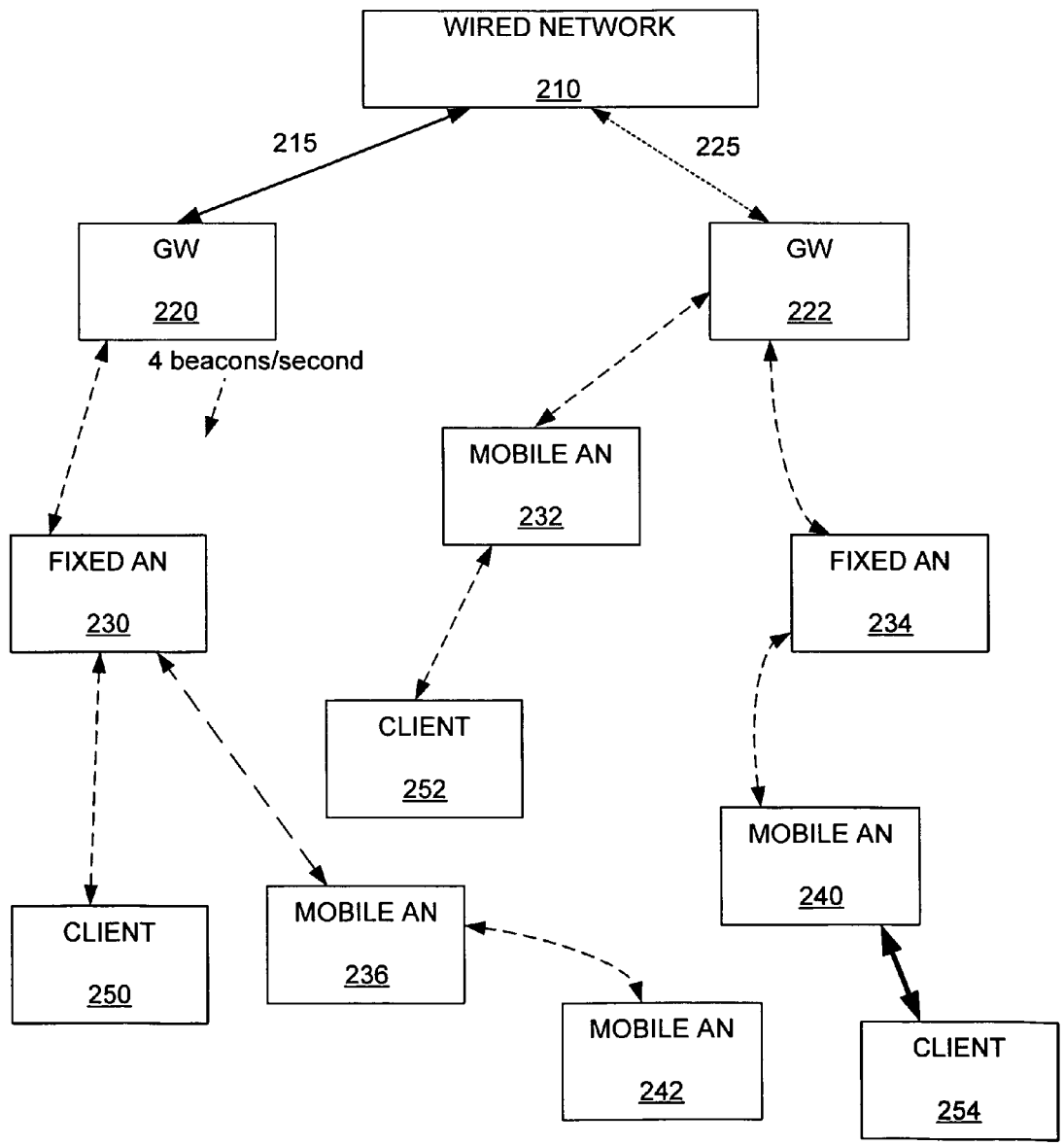
FIG. 2 shows a wireless network that includes fixed access nodes and mobile access nodes.

FIG. 2 shows a wireless mesh network that includes fixed access nodes and mobile access node. The wireless mesh network includes gateways 220, 222. The gateways 220, 222 are connected to a wired network 210. The gateways 220, 222 can be either wired or wirelessly connected to the wired network 210. The wired network 210 can be the internet, or can be connected to the internet. As will be described later, the gateways originate routing beacons (packets) at a predetermined rate, such as, four routing beacons per second.

The mesh network further includes access nodes 230, 232, 234, 236, 240, 242. The access nodes can include fixed access nodes 230, 234 and mobile access nodes 232, 236, 240, 242. The fixed access nodes 230, 234 remain in a relatively stable location with respect to the rest of the network. The mobile access nodes 232, 236, 240, 242 can move their locations with respect to the rest of the network.

Clients 250, 252, 254 can be wired or wirelessly connected to the access nodes 230, 232, 234, 236, 240, 242. A shown in FIG. 2, a first client 250 is wirelessly connected to the fixed access node 230, a second client 252 is wirelessly connected to the mobile access node 232, and a third client 254 is wired connected to the mobile access node 240.

Allowing mobile access nodes to move relative to the rest of the mesh network requires the mesh network to be dynamic. The routing selections between gateways and clients should be continually monitored and reselected. Additionally, mobile access nodes and clients should be able to move within the network without the clients being required to carry special hardware or software.

Figure 3:
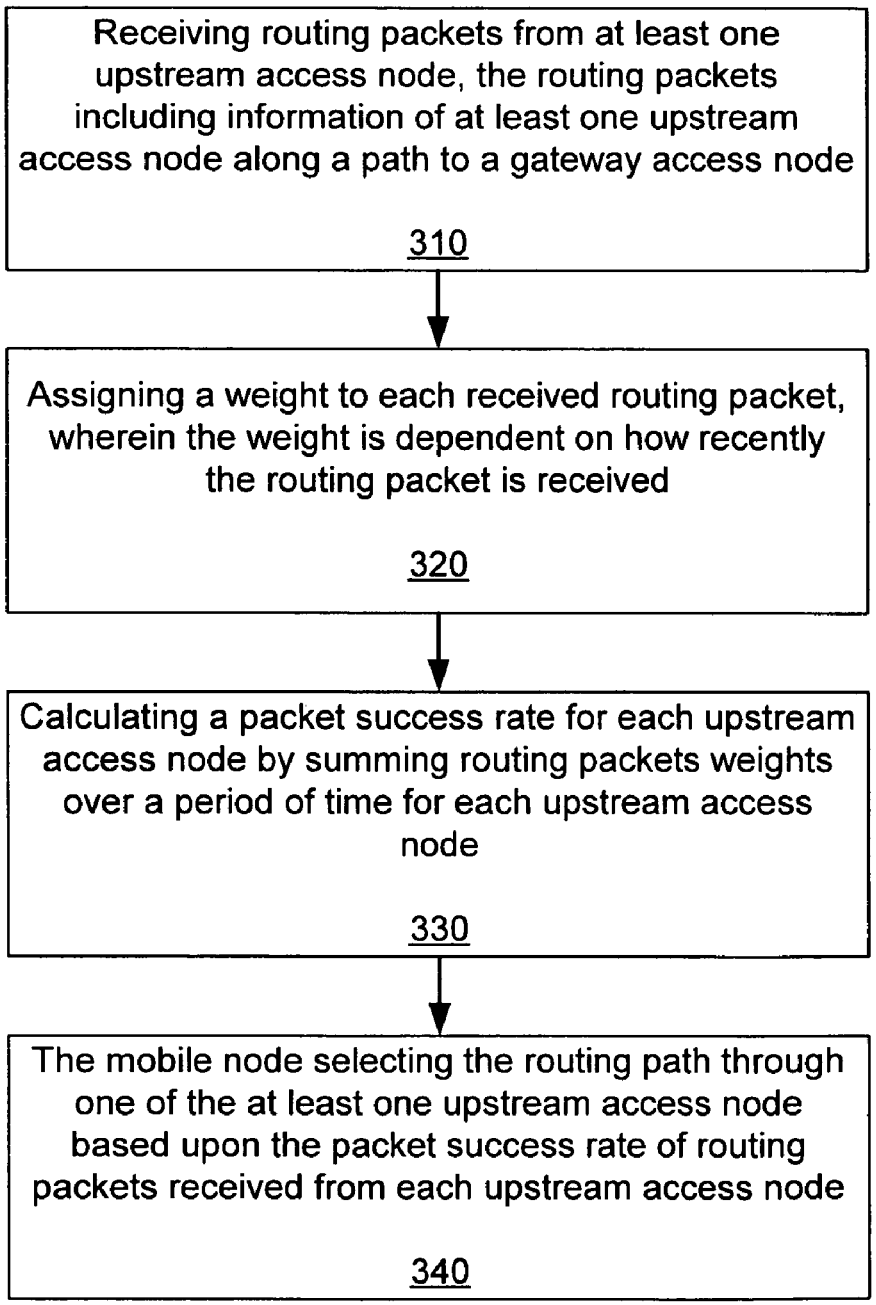
FIG. 3 is a flow chart that includes steps of an exemplary method for mobile access node routing selection through a mesh network.

FIG. 3 is a flow chart the shows an exemplary method of mobile access node routing through a mesh network. A first step 310 includes receiving routing packets from at least one upstream access node, the routing packets including information of at least one upstream access node along a path to a gateway access node. A second step 320 includes assigning a weight to each received routing packet, wherein the weight is dependent on how recently the routing packet is received. A third step 330 includes calculating a time-weighted packet success rate for each upstream access node by summing routing packets weights over a period of time for each upstream access node. A fourth step 340 includes the mobile node selecting the routing path through one of the at least one upstream access node based upon the packet success rate of routing packets received from each upstream access node.

Gateways broadcast routing packets at a predetermined rate. Access nodes (other than gateway access nodes) rebroadcast routing packets at a rate at which routing packets are received from selected upstream access nodes. Since access nodes only rebroadcast routing packets that are successfully received from the selected upstream access node, any node further downstream receive these routing packets at a rate that effectively incorporates the quality of the path from the receiving node back to the gateway (end to end path quality). In one embodiment, four routing packets are broadcast every second. Generally, the most recently received routing packet is assigned a greatest weight. The packet success rate can be calculated by summing the weights and dividing by a maximum possible value of the summed packet weights over a predetermined amount of time. The routing packets are broadcast by a gateway at a predetermined rate. Knowing the predetermined rate at the gateway enables calculation of the packet success rate by comparing the number of routing packets received over an interval to the maximum number of routing packets that could have been received over that interval of time given the predetermined rate. As will be described, routing selections are preferably through upstream fixed access nodes, but can be through upstream mobile access nodes. Generally, an upstream mobile access node will only be selected if the packet success rate of the upstream mobile access node is a predetermined amount greater than the packet success rate of all upstream fixed access nodes. Persistence tests can include a short persistence test for checking that a link is alive, and a long persistence test for selecting a route. Generally, the persistence test intervals for mobile access node are shorter than a comparable persistence test intervals used by fixed access nodes of the mesh network.

During an access node route selection, a default next-hop access node (also referred to as default gateway) is selected. The route corresponding to the default next-hop access node is advertised by the access node making the selection by modifying the received routing beacons of the selected route, and re-broadcasting the modified routing beacons. The mobile node can modify the routing packets to include at least one of an IP address of the mobile node, a MAC address of the mobile node, an indication that the routing packet is being re-broadcast by a mobile access node, a current packet success rate, and/or a reverse link success rate. An access node can additionally determine and use reverse link qualities for path selections. The reverse link qualities can be determined through routing packet persistence tests as well. For mobile access nodes, the persistence test can include determining a reverse packet success rate.

When an access node or gateway receives a data packet, it inspects the destination IP address and look up the IP address in the route table of the access node. If an entry for the IP address does not exist, the access node or gateway forwards the data packet to its default gateway, also referred to as a default next hop access node.

A router, such as an access node, typically maintains a route table which is a list of route entries. The router (access node) performs route table lookups to determine the forwarding path for received data packets. The route table may also include a default route.

Figure 4:
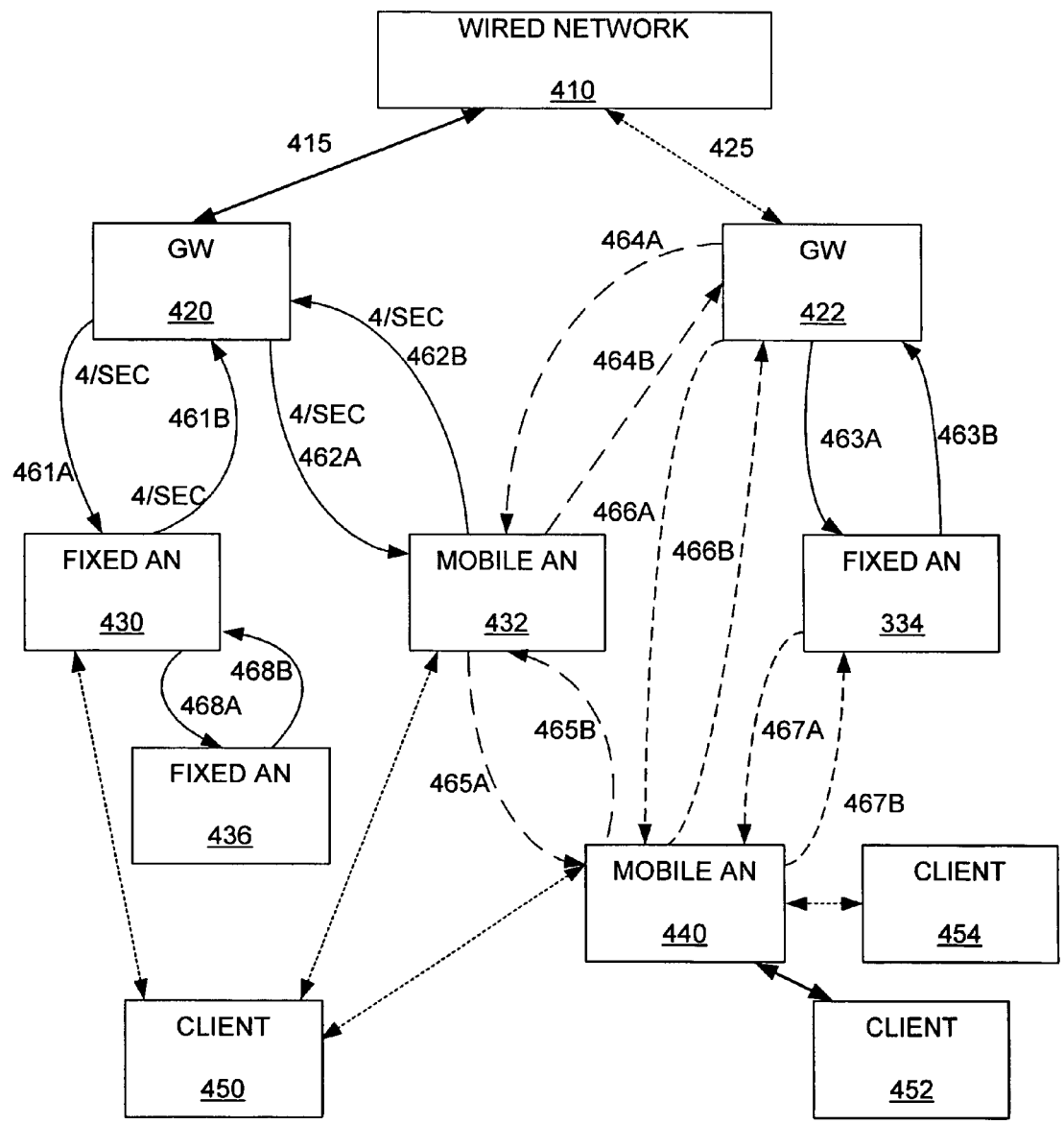
FIG. 4 shows a wireless network that includes possible routing selections that can be made between clients and gateways.

FIG. 4 shows a wireless network that includes possible routing selections (both mobile access node and fixed access node) that can be made between clients and gateways. The wireless network includes gateways 420, 422 which are coupled to the wired network 410. The gateways 420, 422 typically include high bandwidth connections 415 to the wired network 410 which can be wired or wireless. A gateway is an access node that can originate routing beacons, as will be described.

Routing Selections

Access nodes 430, 432, 434, 436, 440 (both fixed access nodes and mobile access nodes) are coupled either directly or indirectly to the gateways 420, 422. That is, each access node is either directly connected to an upstream gateway 420, 422, or indirectly connected through another access node to at least one of the upstream gateways 420, 422. The decision of which access nodes or gateways each access node is connected, can include many factors. The network of FIG. 4 can include any number of additional gateways and access nodes. As shown in FIG. 4, a client 450 can obtain access to the network by establishing a connection to an available access node, such as, any of access nodes 430, 432, 440.

Gateways 420, 422 broadcast routing packets (beacons), which can be used to determine routing between access nodes 430-440 and gateways 420, 422 of the network. The beacons are received by all first-level access nodes (for example, fixed and mobile access nodes 430, 432, 434), which are access nodes that are able to receive gateway transmitted beacons, and directly route data through to a gateway. For an exemplary embodiment, the beacons originate at the gateways 420, 422 at a predetermined rate. For example, FIG. 4 depicts routing beacons being originated at the gateway 420 at a rate of 4 routing beacons per second. The first-level access nodes can measure the quality of the link between them and the gateways by comparing the number of routing beacons received over a period of time with the total number of beacons transmitted over the period of time. For example, the first-level access nodes can count the number of beacons received over a ten second period. This number can be compared with the number transmitted (40) over the ten second period to determine the quality of the link between the first-level access node and the transmitting gateway.

The beacons are used to establish a route from each access node to a gateway. The first-level access nodes re-broadcast the routing beacons, attaching their own information to the routing beacons. The first-level access nodes maintain the routing beacon transmission rate as determined by the gateways. That is, the gateways transmit the routing beacons at a rate of four per second, and the first-level access nodes re-broadcast the modified routing beacons at the same rate at which routing beacons are successfully received by the access nodes. This allows the second-level access nodes to measure the path quality between them and the gateways. The first level access nodes re-broadcast the beacons after adding first level access node information, such as the address of the first level access node. First level access nodes can be fixed access nodes or mobile access nodes. It is to be understood that there can be any number of mobile and fixed access nodes any number of hops away from a gateway.

Mobile Node Routing Selections

Due to their mobility, the transmission links of mobile access nodes are likely to change more rapidly than the transmission links of fixed access nodes. Therefore, the quality of selected routes (and non-selected routes) is likely to change more rapidly than fixed access nodes. As a result, the routing selections of the mobile access nodes should occur more often, and place a greater weight on routing beacons most recently received.

An example of how a mobile access node selects an upstream routing path includes the mobile access nodes receiving routing packets (routing beacons) from at least one upstream access node. As described, the routing packets including information of at least one upstream access node along a path to a gateway access node. The mobile node assigns a weight to each received routing packet, in which the weight is dependent on how recently the routing packet is received. The mobile node calculates a packet success rate for each upstream link by summing routing packets weights over a period of time for each upstream link. The mobile node selects a routing path through at least one upstream access node based upon the packet success rate of routing packets received from each upstream access node.

An additional packet success rate calculation can include dividing the summed routing packet weight by a maximum possible number possible for the sum.

The routing selections can be based at least in part upon short and long routing packet success rates. For example, a short test can be used to determine whether a link is alive. A long test can include beacons received over a longer period of time, and aid in the routing selections. For example, the short test can buffer (receive and store) ten seconds worth of received routing beacons, and a long test can buffer additional routing beacons for a total time of 40 seconds. The maximum number of beacons that can be received is set by the rate (for example, four routing beacons per second) and the period of time of reception. For fixed nodes, a routing selection typically includes counting the number of routing packets received through each upstream link, and determining the best link based on this number. As described, mobile nodes weight the routing beacons to additionally influence the routing selections based upon when the beacons were received. Typically, the mobile access nodes perform the long and short test more frequently than the fixed access node because of their mobility.

As will be described, mobile nodes prefers to select an upstream route through a fixed access node, but will select an upstream route through another mobile access node if the upstream mobile access node has a link quality a predetermined amount greater than the link quality of any fixed access node.

Due to the potential mobility of mobile access nodes, an embodiment includes preventing fixed nodes from ever selecting a link through an upstream mobile node. That is, fixed access nodes only select links and routing paths through upstream fixed nodes.

As previously described, the beacons are used to establish a route from each access node to a gateway. The first level access nodes re-broadcast the beacon data, attaching their own information to the beacon. The information indicates to the second level access nodes that the path to the gateway includes the first level access node. As each access node rebroadcasts the beacons, each access node adds additional information. The rebroadcast information can include the addresses of all upstream access nodes along the path to the gateway access node. That is, an embodiment includes each access node that receives routing beacons, modifying the routing beacons of a selected route by attaching an address of the access node, and re-broadcasting the modified beacons. The address can be an IP address of the access node or a MAC address of the access node. Other information can include an indication that the routing packet is being re-broadcast by a mobile access node, a current packet success rate, or a reverse link success rate.

For one embodiment, the link quality of the beacon received determines whether that beacon is rebroadcast by the access node. If the quality of the beacon is the best of all received beacons, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway. The link qualities can be influenced by other wireless transmission factors such as interference, noise and fading. Typically, the link qualities vary more for mobile access nodes than for fixed access nodes. The link qualities can be determined be calculating the percentage of beacons that are transmitted and successfully received. The link qualities can alternatively be determined by measuring a PER, BER or SNR of received routing beacons.

The first level access nodes 430, 432, 434 include upstream links in an uplink direction, and upstream links in a downlink direction to the gateways 420, 422. As shown in FIG. 4, fixed access node 430 includes a upstream link in downlink direction 461A and an upstream link in the uplink direction 461B with the gateway 420, mobile access node 432 includes a upstream link in the downlink direction 462A and an upstream link in the uplink direction 462B with the gateway

420, and fixed access node 434 includes a upstream link in the downlink direction 463A and an upstream link in the uplink direction 463B with the gateway 422. The quality of a downlink direction link can be different than the quality of the corresponding uplink direction link. For example, the quality of the upstream link in the downlink direction 461A can be different than the quality of the upstream link in the uplink direction 461B, the quality of the upstream link in the downlink direction 462A can be different than the quality of the upstream link in the uplink direction 462B, and the quality of the upstream link 463A in the downlink direction can be different than the quality of the upstream link in the uplink direction 463B. Link asymmetries can arise because of differences in transmit power levels at each end of the link, or due to environmental effects or signal interference.

The asymmetrical characteristics of the links between access nodes (fixed and mobile) and the gateways can lead to non-optimal routing selections if, for example, the quality of the upstream links in the uplink direction is not included in routing decisions by access nodes (fixed and mobile) to gateways. Each gateway and access node transmits beacons. All access nodes and gateways that receive the beacons can make an estimate of the quality of the link based upon the reception of the beacons. The estimates can include upstream link quality in the uplink direction and in the downlink direction. Once each access node has the uplink direction and downlink direction link qualities within every possible data path to a gateway, the access node can make a selection of the best available data path.

As shown in FIG. 4, the first level mobile access node 432 routes data through the gateway 420. However, the mobile access node 432 could have selected the gateway 422 to route data. A possible link between the mobile access node 432 and the gateway 422 includes the downlink 464A and the uplink 464B. The mobile access node 432 selects the gateway to route data by selecting the best combination of uplinks and downlinks. If the mobile access node 432 determines that the downlink 464A/uplink 464B combination of the gateway 422 is better than the downlink 462A/uplink 462B combination of the gateway 420, then the mobile access node 432 can select to route date through the gateway 422.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 4 also includes a second level mobile access node 440. As shown, the mobile access node 440 can select a data path through mobile access node 432 (through downlink 465A and an uplink 465B), through fixed access node 434 (through downlink 467A and an uplink 467B), or through gateway 422 (through downlink 466A and uplink 466B). The mobile access node 440 makes a data path routing selection based upon the best quality combination of the links (downstream and upstream) and whether the upstream node broadcasting the received beacon is a fixed access node or mobile access node.

Routing Selections Based on Downstream and Upstream Link Qualities

As has been described, downstream link qualities can be determined by measuring a persistence of the routing beacons transmitted from an upstream node. For a mobile node, the beacons are weighted in which the most recently received beacon is assigned the greatest weight.

Upstream link qualities in the uplink direction can also be measured by persistence of routing beacons in the opposite (upstream) direction. For example, the first level access nodes 430, 432, 434 can transmit routing beacons at a predetermined rate which are received by upstream gateways 420, 422. The gateways count the received upstream beacons, and therefore, can perform a persistence test because the beacons were transmitted at a predetermined rate. The gateways can then include this upstream persistence information in their routing beacons. This way, the first level access nodes 430, 432, 434 can obtain information of both the downstream and the upstream link qualities. That is, the uplink information is included within the downstream link routing beacons, and the downstream link information can be determined by measuring the persistence of the downstream link routing beacons. This information (uplink quality and downlink quality) provides for a more intelligent link selection. The upstream devices that perform the upstream link persistence test can be either gateways as described, or other upstream access nodes.

For mobile nodes, the upstream persistence test can include a weighting of the routing beacons in which the most recently received beacons get the greatest weight. That is, an upstream device performs a packet success rate in a way that is dependent upon whether the downstream access node is a mobile access node or a fixed access node. As previously stated, the device (gateway or access node) that is upstream from the mobile access node determines the weighted packet success rate, and then includes this information within its own broadcast routing beacons, allowing the downstream mobile access node to determine link qualities of both the upstream and downstream directions of the link.

Beacon Selection—Fixed Access Node versus Mobile Access Node

Routing selections can be dependent upon whether the upstream access node is a fixed access node or a mobile access node. In one embodiment, the route selection protocol of a fixed access node can limit the fixed access node to only select a route through an upstream fixed access node, rather than through an upstream mobile access node. In another embodiment, the route selection protocol on a fixed access node can include a preference for routes through an upstream fixed access node, with a route through an upstream mobile access node only being chosen if it has a path quality that is better than any route through a fixed access node by at least a predefined margin. This behavior is desirable because routes through mobile access nodes can be inherently unstable because of the mobility of the mobile access nodes and less preferable than routes through fixed access nodes. Additionally, mobile nodes can be allowed to select routes that include both mobile access nodes and fixed access nodes upstream. Additionally, a mobile access node's routing protocol can include a preference for paths through a fixed access node as the next hop upstream router as opposed to choosing a path through an upstream mobile access node. Other routing selection protocols allow fixed access nodes to route through both upstream fixed access nodes and mobile access nodes.

The routing packets can be designated as beacons, and include routing information. The wireless links can utilize the 802.11 protocol, but the routing beacons are distinct from 802.11 beacons. Routing beacon originating gateways can also be access nodes.

Figure 5:
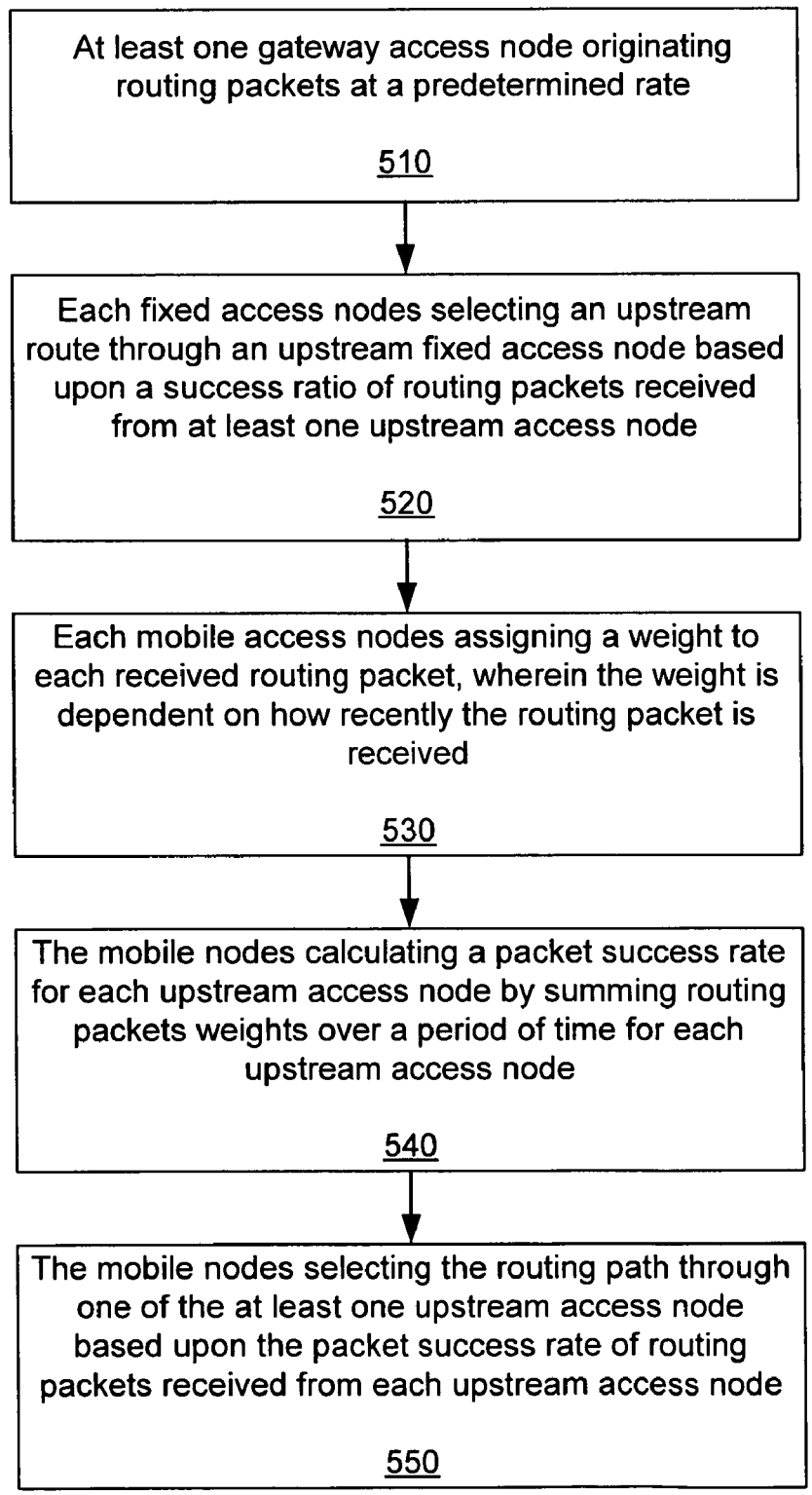
FIG. 5 is a flow chart showing an exemplary method of selecting routing paths through a wireless mesh network that includes fixed access nodes and mobile access nodes.

FIG. 5 is a flow chart showing an exemplary method of selecting routing paths through a wireless mesh network that includes fixed access nodes and mobile access nodes. A first step 510 includes at least one gateway access node originating routing packets at a predetermined rate. A second step 520 includes each fixed access nodes selecting an upstream route through an upstream fixed access node based upon a packet success rate of routing packets received from at least one upstream access node. A third step 530 includes each mobile access nodes assigning a weight to each received routing packet, wherein the weight is dependent on how recently the routing packet is received. A fourth step 540 includes the mobile nodes calculating a packet success rate for each upstream access node by summing routing packets weights over a period of time for each upstream access node. A fifth step 550 includes the mobile nodes selecting the routing path through one of the at least one upstream access node based upon the packet success rate of routing packets received from each upstream access node.

The routing selection can be performed by software operating within the access nodes. The software can be programmed to assign a weight to each routing packet received by the mobile access node, wherein the weight is dependent on how recently the routing packet is received. A packet success rate is calculated for each upstream access node by summing routing packets weights over a period of time for each upstream access node. The mobile node selects the routing path through one of the at least one upstream access node based upon the packet success rate of routing packets received from each upstream access node. Generally, the selection includes a preference for routing paths having the best (greatest) packet success rate.

Although specific embodiments of the invention have been described and illustrated, the invention is not to be limited to the specific forms or arrangements of parts so described and illustrated. The invention is limited only by the appended claims.

What is claimed:

1. A method of a mobile access node selecting a routing path through a mesh network, comprising:
   receiving routing packets from at least one upstream access node, the routing packets including information of at least one upstream access node along a path to a gateway access node;
   assigning a weight to each received routing packet, wherein the weight is dependent on how recently the routing packet is received;
   calculating a packet success rate for each upstream access node by summing routing packets weights over a period of time for each upstream access node;
   the mobile node selecting the routing path through one of the at least one upstream access node based upon the packet success rate of routing packets received from each upstream access node,
   wherein calculating the packet success rate further comprises dividing the summed packet weights of routing packets from each upstream access node by a maximum possible value of the summed packet weights over a predetermined amount of time.

2. The method of claim 1, wherein more recently received routing packets are assigned greater weights.

3. The method of claim 1, wherein selecting the routing path includes a preference for paths having a best packet success rate.

4. The method of claim 1, further comprising the gateway access node broadcasting routing packets at a predetermined rate.

5. The method of claim 4, further comprising the mobile access node receiving routing packets, modifying the routing packets and re-broadcasting the routing packets received from a default gateway.

6. The method of claim 5, wherein a routing path through an upstream mobile access node is selected if the packet success rate of routing packets from the upstream mobile access node is at least a predetermined amount greater than the packet success rate of all upstream fixed access nodes.

7. The method of claim 1, further comprising selecting the routing path based upon whether the at least one upstream access node is a fixed access node or another mobile access node.

8. The method of claim 1, wherein a persistence test interval used by the mobile access node is shorter than a comparable persistence test interval used by fixed access nodes of the mesh network.

9. The method of claim 1, wherein the mobile node modifies routing packets received over the selected routing path, and re-broadcasts the modified routing packets.

10. The method of claim 9, wherein the mobile node modifies the routing packets to include at least one of an IP address of the mobile node, a MAC address of the mobile node, an indication that the routing packet is being re-broadcast by a mobile access node, a current packet success rate, and a reverse link packet success rate.

11. The method of claim 1, further comprising the mobile access node determining a reverse link quality between the mobile access node and the at least one upstream access node.

12. The method of claim 11, wherein the reverse link quality is dependent on a reverse packet success rate of reverse routing packets transmitted upstream.

13. The method of claim 11, wherein the route selection by the mobile access node is additionally based upon the reverse link quality between the mobile access node and the at least one upstream access node.

14. The method of claim 11, wherein higher reverse link quality paths are given higher preference.

15. A method of selecting routing paths through a wireless mesh network comprising fixed access nodes and mobile access nodes, the method comprising:
   at least one gateway access node originating routing packets at a predetermined rate;
   each fixed access nodes selecting an upstream route through an upstream fixed access node based upon a packet success rate of routing packets received from at least one upstream access node;
   each mobile access nodes assigning a weight to each received routing packet, wherein the weight is dependent on how recently the routing packet is received;
   the mobile nodes calculating a packet success rate for each upstream access node by summing routing packets weights over a period of time for each upstream access node;
   the mobile nodes selecting the routing path through one of the at least one upstream access node based upon the packet success rate of routing packets received from each upstream access node,
   wherein calculating the packet success rate further comprises dividing the summed packet weights of routing packets from each upstream access node by a maximum possible value of the summed packet weights over a predetermined amount of time.

16. The method of claim 15, further comprising each mobile access node selecting an upstream route through an upstream access node depending on whether the upstream access node is an upstream fixed access node or an upstream mobile access node.

17. The method of claim 16, wherein each mobile access node selects an upstream mobile access node only if the packet success rate of the upstream mobile node is better than all other mobile access nodes, and the packet success rate of the upstream mobile access node is a predetermined amount greater that the packet success rate of all fixed access nodes.

18. The method of claim 15, wherein fixed access nodes only select upstream fixed access nodes.

19. The method of claim 15, wherein the packet success rate is determined by comparing a number of successfully received routing packets per unit of time with the predetermined rate.

20. The method of claim 15, wherein calculating the packet success rate further comprises dividing the summed packet weights of each upstream device by a maximum possible value of the summed packet weights over a predetermined amount of time.

21. The method of claim 15, wherein a persistence test interval used by the mobile access nodes is shorter than a comparable persistence test used by fixed access nodes of the mesh network.

22. The method of claim 15, wherein the fixed access nodes and the mobile nodes modify routing packets received over selected routing paths, and re-broadcasts the modified routing packets.

* * * * *